United States Patent [19]

Dickens

[11] Patent Number: 4,653,718
[45] Date of Patent: Mar. 31, 1987

[54] MOLDING STRUCTURE FOR SUPPORTING PREFORM INSERTS

[75] Inventor: Luther I. Dickens, Radford, Va.

[73] Assignee: Radva Corporation, Radford, Va.

[21] Appl. No.: 683,394

[22] Filed: Dec. 19, 1984

[51] Int. Cl.⁴ .............................................. B29C 33/16
[52] U.S. Cl. ........................................ 249/95; 249/91; 249/96; 249/184; 264/46.7; 264/275; 425/3
[58] Field of Search ............... 249/83, 91, 95, 96, 249/97, 175, 184; 264/45.4, 46.4, 46.7, 275; 425/3

[56] References Cited

U.S. PATENT DOCUMENTS

| | | | |
|---|---|---|---|
| 974,024 | 10/1910 | Carter | 249/91 |
| 1,696,694 | 12/1928 | Senesac | 249/184 |
| 1,821,951 | 9/1931 | Thompson | 249/96 |
| 2,366,656 | 1/1945 | Saffert | 249/95 |
| 2,397,728 | 4/1946 | Dowsett et al. | 249/96 |
| 2,713,190 | 7/1955 | Reitter | 249/95 |
| 3,693,928 | 9/1972 | Shoemaker | 249/97 |
| 3,956,451 | 5/1976 | Adams | 264/46.7 |
| 4,106,743 | 8/1978 | Dendinger | 249/97 |
| 4,284,447 | 8/1981 | Dickens et al. | 264/46.7 |
| 4,296,909 | 10/1981 | Haeussler | 249/97 |

FOREIGN PATENT DOCUMENTS

| | | | |
|---|---|---|---|
| 38-1224 | 2/1963 | Japan | 249/96 |
| 879077 | 10/1961 | United Kingdom | 249/95 |
| 1442622 | 7/1976 | United Kingdom | 264/46.7 |

Primary Examiner—Jay H. Woo
Assistant Examiner—James C. Housel
Attorney, Agent, or Firm—Alvin E. Hendricson

[57] ABSTRACT

An improved molding structure for producing a building panel or the like of expanded cellular core material having reinforcing strips flush with surfaces thereof and including one or more indentations or depressions having reinforcing elements extending therein and anchored within the core.

2 Claims, 4 Drawing Figures

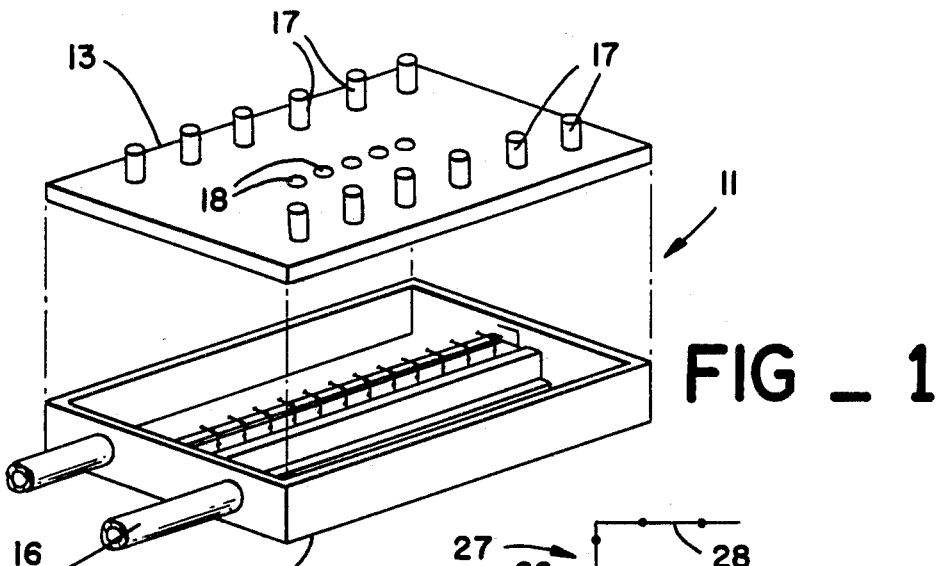
FIG_1
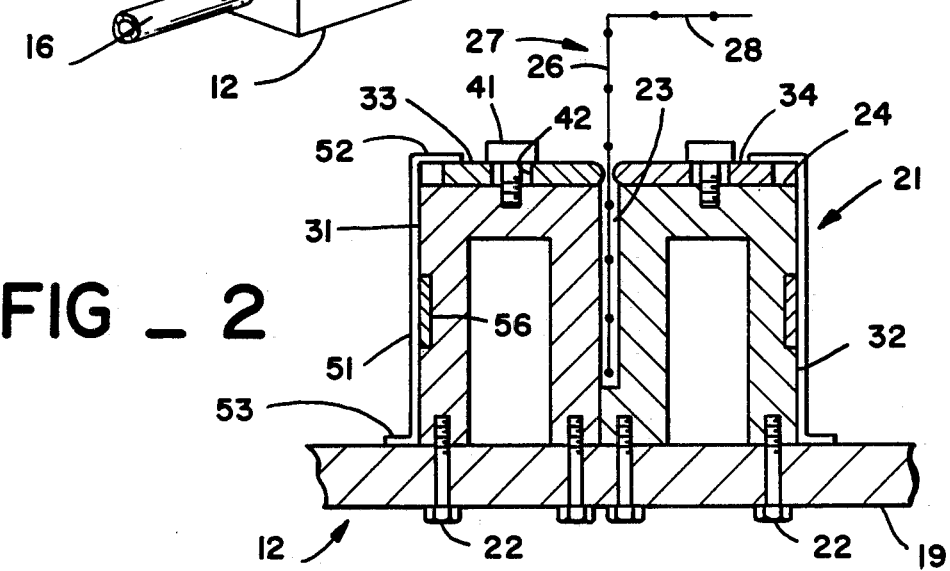
FIG_2
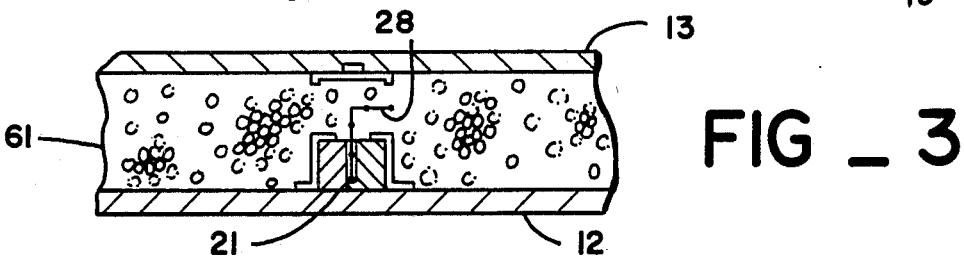
FIG_3
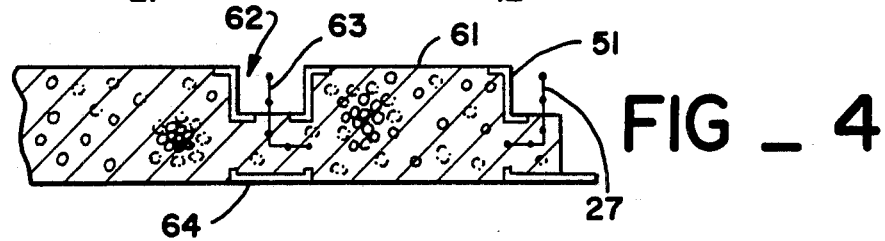
FIG_4

MOLDING STRUCTURE FOR SUPPORTING PREFORM INSERTS

BACKGROUND OF INVENTION

The art of forming structures of expanded polystyrene, expanded polyurethane and the like has long been practiced. Commmonly such structures are mass produced by blowing pellets into a mold and applying heat thereto as by injecting steam into the mold. One such process for forming building panels having reinforcing strips thereon is shown in U.S. Pat. No. 4,284,447.

There have also been developed methods of incorporating various types of structural or reinforcing elements in expanded cellular units as shown, for example, in U.S. patent application Ser. No. 232,225 entitled "Insulating Panel and Building Structure" and filed in the U.S. Patent & Trademark Office on Feb. 6, 1981 by the present inventor, and now abandoned.

There has recently been developed an improved building panel incorporating reinforcing mesh or the like that extends from the interior of an expaned cellular core into depressions or indentations in the core and adapted to be filled with concrete. The present invention provides an improved method and system for molding reinforcing mesh or the like in such a core.

SUMMARY OF INVENTION

The present invention provides an improved method and structure for molding reinforcing wire or the like in an expanded cellular core with the wire extending into depressions or indentations in the ends product of molding. In particular, the present invention relates to implanting reinforcing wire or wire mesh in the core of an insulating building panel with the wire extending into one or more depressions in the panel that are adapted to be filled with concrete to produce reinforced concrete beams and/or columns intergrally with the panel in a building structure.

Within a separable mold there is mounted an insert, such as a pair of facing blocks, by bolting the blocks to a bottom side of the mold. These block define a narrow slot therebetween extending from an open top to a bottom that is spaced from the bottom of the mold. These block are configured and dimensioned to define together a depression of predetermined size and shape in the molded article. Reinforcing wire, such as wire mesh is bent or formed in a inverted "L" shape and the depending leg thereof is inserted in the slot between the blocks. Preferably there are also provided one or two adjustably positioned plates atop the blocks and movable toward and away from each other over the top of the slot.

An insulated building panel that may be molded in accordance with the present invention may have metal reinforcing strips upon surfaces thereof and the present invention includes magnets embedded in the sides of the aforementioned blocks for holding such strips in position within the mold.

The present invention is intended for use in the molding of expanded cellular articles such as panel cores and any small amount of material that might enter the tip of the slot between the blocks hereof will merely break off when the core or the like is removed from the mold. With the wire in place in the mold, as established by the present invention, the mold is closed and filled with material such as polystyrene pellets, for example, and the material is heated to form an integral expanded cellular article filing the mold. This heating may be accomplished by introducing steam into the closed mold through small apertures provided for this purpose. Metal reinforcing strips mounted in the mold may be adhered to the core material during molding by a heat activiated adhesive applied to the strips.

It will be appreciated that the wire mesh or the like mounted in the mold hereby is firmly anchored in the expanded cellular material and upon removal of the molded article or core from the mold the leg of the wire mesh or the like will extend into a depression in the molded core. This then provides both an anchor and reinforcement for concrete or the like subsequently poured or otherwise placed in the molded core depression.

BRIEF DESCRIPTION OF FIGURES

The present invention is illustrated with respect to preferred steps of the method and a preferred embodiment of the structure in the accompanying drawings, wherein:

FIG. 1 is an exploded perspective view of a mold including an embodiment of the present invention;

FIG. 2 is a cross sectional view of a portion of a mold and showing a manner of mounting a reinforcing element for molding in accordance with the present invention;

FIG. 3 is a schematic representation of a molding operation in accordance herewith; and FIG. 4 is an end view of a part of a panel molded in accordance herewith.

DESCRIPTION OF PREFERRED EMBODIMENT

The present invention provides a particular manner of incorporating elements within an expanded cellular structure and particularlly elements that extend from such structure. In particular the present invention is directed to the production of insulated building panels having an expanded cellular core with reinforcing strips thereon and including one or more depression into which there extends reinforcing structure anchored into the core. In this respect reference is made to U.S. patent application Ser. No. 590,472 entitled "Panel for Column and Beam Structures" and filed in the U.S. Patent Office on Mar. 16, 1983 by the same inventor, and now abandoned.

Referring first to FIG. 1 of the drawing there will be seen to be provided a separable mold 11 having a bottom protion 12 and a top portion 13 adapted to be placed together and held in such position, by means not shown. The bottom portion is illustrated to having upstanding side walls and thus to define with the top portion an internal mold cavity 14 which is configured to define the shape of an article to be molded in the mold 11. In the present instance, it is illustrated that a flat panel shall be formed and thus the interior chamber 14 is formed as a rectangular chamber having a thickness equal to the desire thickness of the panel. The present invention relates to the molding of expanded cellular material such as Styrofoam and the like which is conventionally accomplished by the provision of pellets of the material which may, for example, be supplied to the interior of the mold through one or more conduits of pipes 16 and the mold filled as by drawing a vacuum therein, as through connections 17. The cellular material is conventionally expanded into a solid unit by the application of heat and this may be, for example, be accomplished by directing steam into the mold cavity or chamber 14, as through nozzle 18.

The present invention operates to form a depression in the material molded into the cavity 14 and at the same time to position an element such as a reinforcing mesh or the like in the molded element and extending into the depression therein. In this respect references made to FIG. 2, wherein there is partially indicated a floor 19 of a bottom mold portion 12. Upon this floor 19 there is mounted an elongated insert or block 21 as by means of bolts 22 extending through the floor 19 and threaded into the block. This block 21 has an external configuration defining the internal configuration of a depression to be formed in a molded element and includes a slot 23 extending therein from a top 24 of the block. The slot 23 is quite narrow and is adapted to receive a first portion 26 of an element 27 that is to be incorporated in the unit molded and having a part thereof extending into a depression in such unit, as defined by the block 21. The slot 23 or at least the opening thereof into the interior of chamber 14 of the mold has a narrow width so as to slidably receive the portion 26 of the element 27 so that little or none of the material molded in the chamber 14 will actually enter the slot.

Considering now the block or insert 21 of the present invention in somewhat greater detail, and referring to the particular application of the present invention noted above, it will be seen that the block may be formed by a pair of inverted elongated rectangular "U" shaped members 31 and 32 extending the length of the mold chamber 14 and bolted to the floor 19 thereof. At least one of the members 32 has an inset portion facing the other member and extending from the top 24 downwardly short of the floor of the mold to define a slot 23 between the members 31 and 32. The hollow centers of the members 31 and 32 are provided only for the purpose of reducing the cost and weight and do not communicate with the mold chamber 14.

Atop the block or insert 21 there are provided a pair of plates 33 and 34 which may have rounded facing edges and are secured to the blocks 31 and 32 in adjustable position. This mounting may be radily accomplished by the provision of bolts 41 extending through narrow slots 42 extending transversely of the plates and into threaded engagements with the top of the elements 31 and 32. The heads of the bolts 41 will bear upon the upper surface of the plates when the bolts are tightened but upon loosening of the bolts it is possible to move the plates toward and away from each other in order to adjust the width of the opening into the slot 23 in the block 21.

In this application of the present invention wherein a building panel is to be formed in the mold 11, the element 27 may be provided as a wire mesh bent into a "L" shape and having depending leg 26 adapted to be inserted in the slot 23 of the block and a horizontal portion 28 which is disposed above the top of the block when the depending leg 26 of the mest is fully inserted into the slot 23. It will be appreciated that the wire mesh or element 26 may be employed as a reinforcing element for concrete or the like that may be subsequently be placed in the core depression and thus the size and weight of the mesh may be varied in order to provide desire reinforcement. Thus the movable or adjustable nature of the top plates 33 and 32 accomodate insertion of elements of different widths in the slot 23.

Again referring to the same application of the present invention it is noted that a building panel that may be formed in accordance with the present invention may include reinforcing strips 51 disposed, for example, along the sides of a depression in the resultant core as defined by the block 21. In the illustration of FIG. 2 a reinforcing strip 51 is shown to be disposed along an outer side of the block element 31 with oppositely directed top and bottom portions 52 and 53 respectively. The bottom portion 52 of the reinforcing strip is shown to rest on the floor 19 of the mold and the strip is dimensioned to disposed the upper portion 52 thereof in overlying relation to the upper surface of the adjustable plate 33 atop the element 31. This reinforcing strip 51, which is preferably formed of a thin metal is shown to be held in the above described position by one or more magnets 56 inset in the outer side of the block element 31. The permanent magnets 56 will thus grip metal reinforcing strip 51 and hold it tightly against the element 31 in the position illustrated during molding operations but will allow removal of the strip with the molded material. In this respect it is noted that the strip 51 is intended to be treated on the outer surface thereof away from the block 21 with an adhesive wich is preferably activated by heat so as to bond the strip to the material molded in the mold 11. Similar provision may be made on the outer side of the other block 32 if it is desired to provide a reinforcing strip on the opposite side of the depression in the resultant molded unit.

Considering now the molding method of the present invention particularly as it relates to the production of an expanded cellular core unit having a depression in a surface thereof with a reinforcing element anchored in the core and extending into the depression. Commencing with a separable mold 11, the present invention provides for mounting of an insert to a floor or possibly a side of the interior of the mold as by bolting the insert to the mold. This insert is provided in a block from with an exterior configuration of a indentation or depression to be formed in the core to be molded. The insert or block 21 is provided with a longitudinal slot 23 therein and communicating with the interior 14 of the mold. A reinforcing member 27 is disposed in this slot with a part of the reinforcing member extending therefrom into the interior of the mold as in the form of an angled portion 28. The top plates 33 and 34 on the block 21 and adjusted to accomodate slidable passage of the element 27 into the slot 23. A metal reinforcing strip 51 may be mounted on one or both sides of the block 21 by magnets 56 and the mold is then enclosed and filled with cellular material which is subsequently expanded by the application of heat as in the form of steam directed into the mold chamber 14.

After the core has been molded in the chamber 14 the mold is separated and the core is removed by sliding the depending portion 26 of the reinforcing element 27 from the slot 23. In this respect it is noted that an adhesive is applied to the outer surface of a reinforcing strip 51 that may be mounted along a side of the block in order to insure bonding of the strip to the core if indeed such a strip is employed.

There may be formed in accordance with the present invention an expanded cellular core 61, as shown in FIG. 4, having a longitudinal depression 62 in one surface thereof with a reinforcing element 63, such as wire mesh, molded into the core and extending into the depression. Complete anchoring of the reinforcing element 63 in the core may be accomplished as illustrated by providing this element with a "L" shape wherein one leg extends into the depression 62 from the bottom thereof and the other leg extends at right angles to the first protion or leg within the expanded cellular material of the core itself. A panel, such as the one formed herein in accordance with the foregoing description, may also incorporate additional reinforcing strips such as channel strip 64 adhered to and extending along an opposite face of the core 61.

It will be appreciated that the present invention is applicabel to incorporate elements such as reinforcing strips at an edge of a molded expanding cellular core as well as the interior thereof. The insert or block 21 may, for example, have one side thereof disposed adjacent a side of a mold part 12 so that the element or reinforcing mesh or the like 27 is in fact disposed in anchored relationship to the core 61 and extends into a depression or inset portion along an edge of the core.

The molding operation of the present invention may also incorporate various other reinforcing strips in a variety of different configurations for a variety of purposes. The present invention, however, is particularly directed to the provision of a depression of predetermined configuration in an expanded cellular core formed in a mold and having an element such as wire mesh reinforcing 63 extending into such depression and anchored within the molded material. As noted above, the purpose of such a resultant structure is set forth in detail in U.S. patent application No. 590,472, now abandoned, and it is particularly important that reinforcing mesh or the like be firmly anchored within the core or the like of such a building panel, for example.

The present invention has been described above with respect to a single preferred embodiment thereof, and particular steps of the methods hereof, however, it will be apparent to those skilled in the art that numerous modifications and variations may be made in the present invention and thus it is not intended to limit the invention to the details of illustrations or terms of descriptions.

What is claimed is:

1. An insert for a separable mold for expanded cellular material comprising
   a rigid block secured to a solid internal surface of a mold and having an external configuration substantially the same as the internal configuration of a depression to be formed in a unit to be molded in said mold,
   said block having at least one narrow opening therein communicating with the interior of said mold for receiving a first part of an element with the remainder of the element extending therefrom into the mold interior, and
   a pair of plates adjustably mounted on said block on opposite sides of the opening in said block for limiting communication between said opening and the interior of said mold,
   whereby material molded in said mold envelops said remainder of said element with the first part thereof extending into a depression in the molded unit when same is removed from the mold.

2. An insert for a separable mold for expanded cellular material comprising
   a rigid block secured to a solid internal surface of a mold and having an external configuration substantially the same as the internal configuration of a depression to be formed in a unit to be molded in said mold,
   said block having at least one narrow opening therein communicating with the interior of said mold for receiving a first part of an element with the remainder of the element extending therefrom into the mold interior, and
   magnets inset in said block and disposed substantially flush with at least one external surface thereof communicating with the mold interior for holding metal elements in said mold for inclusion in the resultant molded unit,
   whereby material molded in said mold envelops said remainder of said element with the first part thereof extending into a depression in the molded unit when same is removed from the mold.

* * * * *